US012687820B2

(12) United States Patent
Guan et al.

(10) Patent No.: US 12,687,820 B2
(45) Date of Patent: Jul. 21, 2026

(54) HIGHLY CHARGED NICKEL ION OPTICAL CLOCK AND ITS IMPLEMENTATION

(71) Applicant: INNOVATION ACADEMY FOR PRECISION MEASUREMENT SCIENCE AND TECHNOLOGY, CAS, Wuhan (CN)

(72) Inventors: Hua Guan, Wuhan (CN); Shaolong Chen, Wuhan (CN); Zhiqiang Zhou, Wuhan (CN); Guosheng Zhang, Wuhan (CN); Yao Huang, Wuhan (CN); Kelin Gao, Wuhan (CN)

(73) Assignee: INNOVATION ACADEMY FOR PRECISION MEASUREMENT SCIENCE AND TECHNOLOGY, CAS, Wuhan (CN)

( * ) Notice: Subject to any disclaimer, the term of this patent is extended or adjusted under 35 U.S.C. 154(b) by 0 days.

(21) Appl. No.: 19/379,803

(22) Filed: Nov. 5, 2025

(65) Prior Publication Data

US 2026/0147318 A1 May 28, 2026

(30) Foreign Application Priority Data

Nov. 27, 2024 (CN) ......................... 202411714861.6

(51) Int. Cl.
*G04F 5/14* (2006.01)
*G04F 13/02* (2006.01)

(52) U.S. Cl.
CPC ................ *G04F 5/14* (2013.01); *G04F 13/02* (2013.01)

(58) Field of Classification Search
CPC .................................. G04F 5/14; G04F 13/02
USPC .................................................... 331/3, 94.1
See application file for complete search history.

(56) References Cited

U.S. PATENT DOCUMENTS 5,327,105 A * 7/1994 Liberman ................ H03L 7/26 331/3

FOREIGN PATENT DOCUMENTS

| | | |
|---|---|---|
| CN | 103809426 A | 5/2014 |
| CN | 110783814 A | 2/2020 |
| CN | 114047681 A | 2/2022 |

* cited by examiner

*Primary Examiner* — Arnold M Kinkead
(74) *Attorney, Agent, or Firm* — Nitin Kaushik

(57) ABSTRACT

The present invention discloses a highly charged Nickel ion optical clock and its implementation method. It uses $Ni^{12+}$ ions as the clock's reference system, which provides superior anti-interference capabilities and measurement precision compared to conventional low-charge-state ion optical clocks. The $Ni^{12+}$ ions possess two transition spectral lines at 498 nm and 511 nm that can serve as clock transitions. Utilizing both 498 nm and 511 nm lasers enables a single ion reference system to output two clock signals, allowing for mutual verification. Frequency calibration using these two laser frequencies facilitates the timely detection of operational issues through abrupt changes in their frequency ratio. This approach avoids the problem inherent in a single optical frequency clock, where losing synchronization with the time reference can result in immediately undetectable, erroneous clock signal outputs, thereby significantly enhancing the overall stability of the optical clock.

8 Claims, 2 Drawing Sheets

HIGHLY CHARGED NICKEL ION OPTICAL CLOCK AND ITS IMPLEMENTATION

CROSS-REFERENCE TO RELATED APPLICATIONS

The application claims priority to Chinese patent application No. 2024117148616, filed on Nov. 27, 2024, the entire contents of which are incorporated herein by reference.

TECHNICAL FIELD

The present invention belongs to the technical field of ionic optical clock, specifically relates to a highly charged Nickel ion optical clock, and also relates to a method for realizing a highly charged Nickel ion optical clock, which is suitable for the field of highly charged ion optical clocks.

BACKGROUND

Atomic clocks have been the cornerstone of time and frequency standards since their invention. Traditional atomic clocks, especially Cesium atomic clocks and Rubidium atoms based on microwave transitions, have been widely used in many fields (such as satellite navigation, communication networks, basic physics research, etc.). However, with the increasing demand for time accuracy, especially in the fields of navigation, precision measurement, gravitational wave detection, and testing of basic physical constants, the accuracy and stability of microwave atomic clocks are no longer able to meet certain cutting-edge needs. To this end, optical clocks (atomic clocks based on optical frequency) have become a hot topic in current scientific research and technological development.

The optical clock has high theoretical accuracy and stability by locking the laser frequency to the electron transition frequency of the atoms or ions in the optical frequency band. Especially the optical clock based on single ions has higher measurement stability and frequency accuracy due to its less external interference. At present, the most representative ionic optical clocks include optical clocks based on $Ca^+$, $Al^+$, $Yb^+$, etc. These low-charge state ions can be stored stably in a vacuum environment, achieving high-precision time-frequency output through laser detection and locking the laser to its transition frequency.

However, with the development of science and technology, traditional low-charge state ion optical clocks have limitations in some complex environments (strong magnetic fields, high energy and other environmental conditions, etc.). Therefore, optical clocks based on high charged ions have become an important direction for the research of next-generation time frequency standards. Highly charged ions have the characteristics of being insensitive to the external environment and being sensitive to changes in physical constants, so they can theoretically provide higher anti-interference ability and measurement accuracy. This provides new possibilities for applications in complex physical environments and extremely high-precision research, such as deep space exploration, gravitational wave detection, basic research on quantum physics, etc.

At present, the research on high charged ion optical clock is still in its infancy and has many technical challenges. For example, there are no high charged ion optical clocks with uncertainty indicators reaching or exceeding the order of E-18, and there are no high charged ion optical clocks that can output two clock signals at the same time. Moreover, when using a single clock for clock signal output, it is impossible to self-judgment whether the optical clock is operating healthily or not when it is out of the real-time calibration of the external clock reference.

SUMMARY

The object of the present invention is to provide a highly charged ion optical clock in response to the above problems existing in the prior art, and also provides a method for realizing a highly charged ion optical clock.

The above-mentioned objective of the present invention is accomplished through the following technical measure:

A highly charged Nickel ion optical clock, comprising an optical clock system and an FPGA control system. The optical clock system includes a cryogenic ion trap system, a highly charged ions source, an ion beamline system, an ultraviolet fluorescence collection system, a laser modulation system, a servo feedback circuit, an optical frequency comb, and a clock signal output system. The highly charged ions source outputs a pulse beam of highly charged Nickel ions to the ion beamline system. The ion beamline system selects and collimates the pulse beam of $Ni^{12+}$ ions, decelerating it before directing it to the cryogenic ion trap system. The cryogenic ion trap system traps the $Ni^{12+}$ ions and also prepares and traps $Be^+$ ions. The laser modulation system outputs a frequency-swept laser to the cryogenic ion trap system, exciting the $Ni^{12+}$ ions to an excited state. The $Ni^{12+}$ ions transfer external state information to the $Be^+$ ions, which then emit a 313 nm fluorescence signal. The ultraviolet fluorescence collection system collects the 313 nm fluorescence emitted by the $Be^+$ ions, obtaining the spectral line shape of the $Ni^{12+}$ ion transition, and outputs this information to the servo feedback circuit. The servo feedback circuit calculates the center of the spectral line shape of the $Ni^{12+}$ ion transition. Based on this center value, the servo feedback circuit outputs an error signal to the laser modulation system, which shifts the frequency of the output laser to lock it to the center of the $Ni^{12+}$ ion transition spectral line. The laser modulation system then outputs the locked laser to the optical frequency comb. The optical frequency comb measures the frequency of the locked laser and outputs the measured laser frequency to the FPGA control system. The FPGA control system outputs a clock signal to the clock signal output system, which in turn outputs the clock signal. Additionally, the FPGA control system interfaces with the cryogenic ion trap system, ion beamline system, ultraviolet fluorescence collection system, laser modulation system, optical frequency comb, and clock signal output system via sequence control signal lines.

As described above, the optical clock system also includes a 313 nm Doppler cooling laser system, a 313 nm repumping laser system, and a 313 nm Raman sideband cooling laser system. The 313 nm Doppler cooling laser system and the 313 nm repumping laser system output 313 nm Doppler cooling laser and 313 nm repumping laser to the cryogenic ion trap system, respectively, to perform Doppler cooling on $Be^+$ ions, while the $Ni^{12+}$ ions are sympathetically cooled. The 313 nm Raman sideband cooling laser system outputs 313 nm Raman sideband cooling laser to the cryogenic ion trap system to perform Raman sideband cooling on the Doppler-cooled $Be^+$ ions, with the $Ni^{12+}$ ions being sympathetically cooled to the vibrational ground state. The FPGA control system is also connected to the 313 nm Doppler cooling laser system, the 313 nm repumping laser system, and the 313 nm Raman sideband cooling laser system via sequence control signal lines.

As described above, the laser modulation system includes a first laser modulation module, which consists of a first acousto-optic modulator and a 498 nm narrow linewidth laser. The 498 nm narrow linewidth laser outputs the 498 nm narrow linewidth laser to the laser input port of the first acousto-optic modulator. The servo feedback circuit outputs an error signal to the modulation input port of the first acousto-optic modulator. The laser output port of the first acousto-optic modulator outputs a 498 nm narrow linewidth frequency-swept laser or a 498 nm narrow linewidth frequency-shifted laser. The FPGA control system is also connected to the first acousto-optic modulator and the 498 nm narrow linewidth laser via sequence control signal lines. When the first acousto-optic modulator and 498 nm narrow linewidth laser are used, the FPGA control system outputs a first clock signal to the clock signal output system, which then outputs the first clock signal.

As described above, the laser modulation system also includes a second laser modulation module, which consists of a second acousto-optic modulator and a 511 nm narrow linewidth laser. The 511 nm narrow linewidth laser outputs the 511 nm narrow linewidth laser to the laser input port of the second acousto-optic modulator. The servo feedback circuit outputs an error signal to the modulation input port of the second acousto-optic modulator. The laser output port of the second acousto-optic modulator outputs a 511 nm narrow linewidth frequency-swept laser or a 511 nm narrow linewidth frequency-shifted laser. The FPGA control system is also connected to the second acousto-optic modulator and the 511 nm narrow linewidth laser via sequence control signal lines. When the second acousto-optic modulator and 511 nm narrow linewidth laser are used, the FPGA control system outputs a second clock signal to the clock signal output system, which then outputs the second clock signal.

A method for realizing a highly charged Nickel ion optical clock, utilizing the highly charged Nickel ion optical clock described above, comprising the following steps:

Step 1: The FPGA control system activates the cryogenic ion trap system to prepare and trap $Be^{+}$ ions.

Step 2: The FPGA control system activates the 313 nm Doppler cooling laser system and the 313 nm repumping laser system to perform Doppler cooling on the $Be^{+}$ ions.

Step 3: The highly charged ions source generates a pulse beam of highly charged Nickel ions. The FPGA control system activates the ion beamline system to select and collimate the pulse beam of $Ni^{12+}$ ions, decelerating it before directing it to the cryogenic ion trap system, where the $Ni^{12+}$ ions are trapped. The $Ni^{12+}$ ions are cooled sympathetically with the $Be^{+}$ ions.

Step 4: The FPGA control system activates the 313 nm Raman sideband cooling laser system to perform Raman sideband cooling on the Doppler-cooled $Be^{+}$ ions, with the $Ni^{12+}$ ions being sympathetically cooled to the vibrational ground state.

Step 5: The FPGA control system activates the 498 nm narrow linewidth laser system, generating 498 nm narrow linewidth laser, which is frequency-shifted via the first acousto-optic modulator. The frequency-shifted 498 nm narrow linewidth laser acts on the $Ni^{12+}$ ions in the vibrational ground state, exciting the $Ni^{12+}$ ions to the first excited state. The $Ni^{12+}$ ions transfer external state information to the $Be^{+}$ ions, which then emit a 313 nm fluorescence signal.

Step 6: The FPGA control system activates the ultraviolet fluorescence collection system to detect and collect the 313 nm fluorescence signal emitted by the $Be^{+}$ ions, and outputs the 313 nm fluorescence signal to the servo feedback circuit.

Step 7: The FPGA control system controls the first acousto-optic modulator to perform frequency sweeping on the 498 nm narrow linewidth laser. The first acousto-optic modulator outputs the frequency-swept laser to the cryogenic ion trap system. The ultraviolet fluorescence collection system synchronously detects and collects the 313 nm fluorescence signal emitted by the $Be^{+}$ ions, obtaining the spectral line shape of the 498 nm transition of $Ni^{12+}$ ions.

Step 8: The ultraviolet fluorescence collection system transmits the spectral line shape of the 498 nm transition of $Ni^{12+}$ ions to the servo feedback circuit. The servo feedback circuit calculates the center value of the 498 nm transition spectral line of the $Ni^{12+}$ ions. Based on the 313 nm fluorescence signal obtained in Step 5, the servo feedback circuit computes the deviation of the 313 nm fluorescence signal from the spectral line center value of the 498 nm transition of the $Ni^{12+}$ ions, and outputs a feedback error signal to the first acousto-optic modulator. The acousto-optic modulator, in response to the error signal, performs frequency shifting on the 498 nm narrow linewidth laser, locking the laser frequency of the 498 nm narrow linewidth laser to the spectral line center value of the 498 nm transition of $Ni^{12+}$ ions.

Step 9: The first acousto-optic modulator outputs the frequency-locked 498 nm narrow linewidth laser to the optical frequency comb for heterodyne detection, measuring the laser frequency of the frequency-locked 498 nm narrow linewidth laser and transmitting this frequency value to the FPGA control system. The FPGA control system then outputs a first clock signal to the clock signal output system, which subsequently outputs the first clock signal.

Step 10: An initial clock reference is set, and the FPGA control system, based on the initial clock reference, controls the optical clock system to repeat Step 2 through 9 for ten cycles.

Step 11: The FPGA control system switches the 498 nm narrow linewidth laser system to the 511 nm narrow linewidth laser system and switches the first acousto-optic modulator to the second acousto-optic modulator. The 511 nm narrow linewidth laser system generates 511 nm narrow linewidth laser, which is frequency-shifted and frequency-swept by the second acousto-optic modulator. Step 1 through 10 are then repeated.

Step 12: Step 1 through 11 are repeated, with the clock signal output system alternately outputting the first clock signal and the second clock signal. The first and second clock signals are cross-verified against each other.

As described above, Step 11 specifically includes the following process: The FPGA control system switches the 498 nm narrow linewidth laser system to the 511 nm narrow linewidth laser system and switches the first acousto-optic modulator to the second acousto-optic modulator. The 511 nm narrow linewidth laser system generates 511 nm narrow linewidth laser, which is frequency-shifted and frequency-swept by the second acousto-optic modulator. Step 1 through 5 are repeated, exciting the $Ni^{12+}$ ions to the second excited state. Step 6 and 7 are repeated, where the ultraviolet fluorescence collection system obtains the spectral line shape of the 511 nm transition of $Ni^{12+}$. Step 7 is repeated, and the servo feedback circuit calculates the spectral line center value of the 511 nm transition of $Ni^{12+}$ ions. The acousto-optic modulator locks the frequency of the 511 nm narrow linewidth laser to the spectral line center value of the 511 nm transition of $Ni^{12+}$ ions. Step 8 and 9 are repeated, and the FPGA control system outputs the second clock signal to the clock signal output system, which subsequently outputs the second clock signal. Step 10 is repeated, where the FPGA control system uses the first clock signal as the clock reference to control the optical clock system to complete the set cycle for ten repetitions.

During the first execution of Step 10, the FPGA control system uses the initial clock reference as the clock reference to output the first clock signal. After that, each subsequent clock signal output uses the previously output clock signal as the new clock reference.

As described above, the first clock signal and the second clock signal are cross-verified in Step 11 through the following process:

The FPGA control system records the laser frequency value $f_1$ of the frequency-locked 498 nm narrow linewidth laser and the laser frequency value $f_2$ of the frequency-locked 511 nm narrow linewidth laser. From the first recorded laser frequency values $f_1$ and $f_2$, the initial ratio $R_0$ of $f_1$ to $f_2$ is determined. After each subsequent recording of a new $f_2$, the ratio R of the new $f_1$ to the new $f_2$ is calculated, and it is checked whether R equals $R_0$. If R equals $R_0$, the verification is considered normal; if R does not equal $R_0$, the verification is considered a fault condition.

The present invention, in comparison to existing technologies, offers the following advantages:

(1) The use of highly charged $Ni^{12+}$ ions as the reference system for the optical clock provides superior anti-interference capabilities and measurement accuracy compared to traditional low-charge state ion optical clocks. Additionally, the highly charged $Ni^{12+}$ ions has two transition spectral lines at 498 nm and 511 nm, which can be used as optical clock transitions. The simultaneous use of 498 nm and 511 nm lasers allows for the output of two clock signals from a single ion reference system, enabling mutual verification. The frequency calibration using two laser frequency values allows for the prompt detection of operational issues through sudden changes in their frequency ratio. This avoids problems that may arise from a single optical frequency clock losing synchronization with the time reference during operation, thus improving the stability of the optical clock output.

(2) The quality factor of the 498 nm transition of $Ni^{12+}$ ions in the present invention reaches $1.1\times10^{16}$. Based on the 498 nm transition of $Ni^{12+}$ ions, the uncertainty in the output of the first clock signal can be better than $5\times10^{-19}$, breaking the current limitations of optical clock uncertainty.

(3) This invention represents the first use of highly charged $Ni^{12+}$ ions as a reference system for the optical clock. The selection of the 498 nm and 511 nm clock transitions to form a dual-clock transition and simultaneously achieve two clock reference signals is also a novel implementation.

Figure 1:
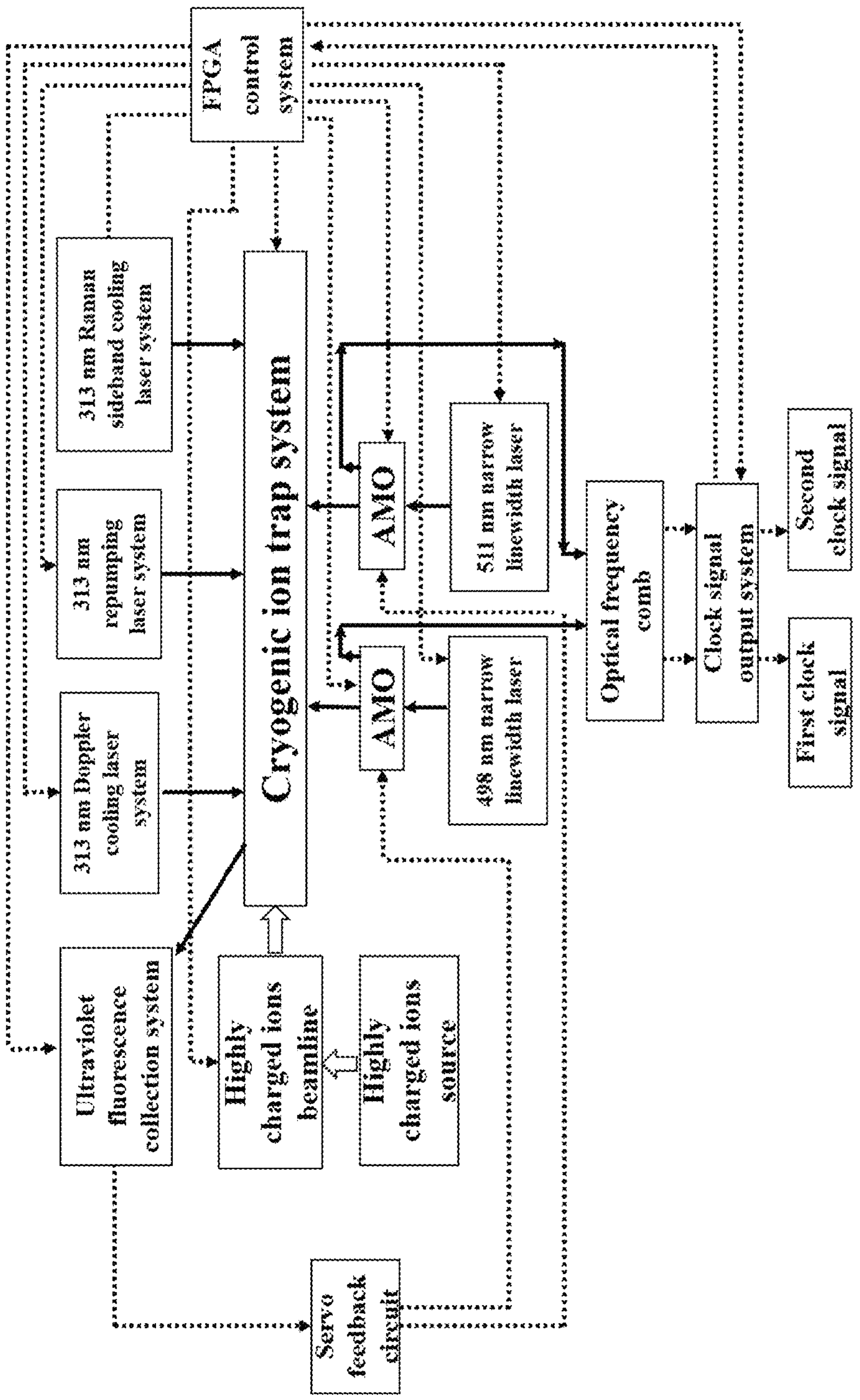
FIG. 1: A schematic diagram of the device of the present invention.
Figure 2:
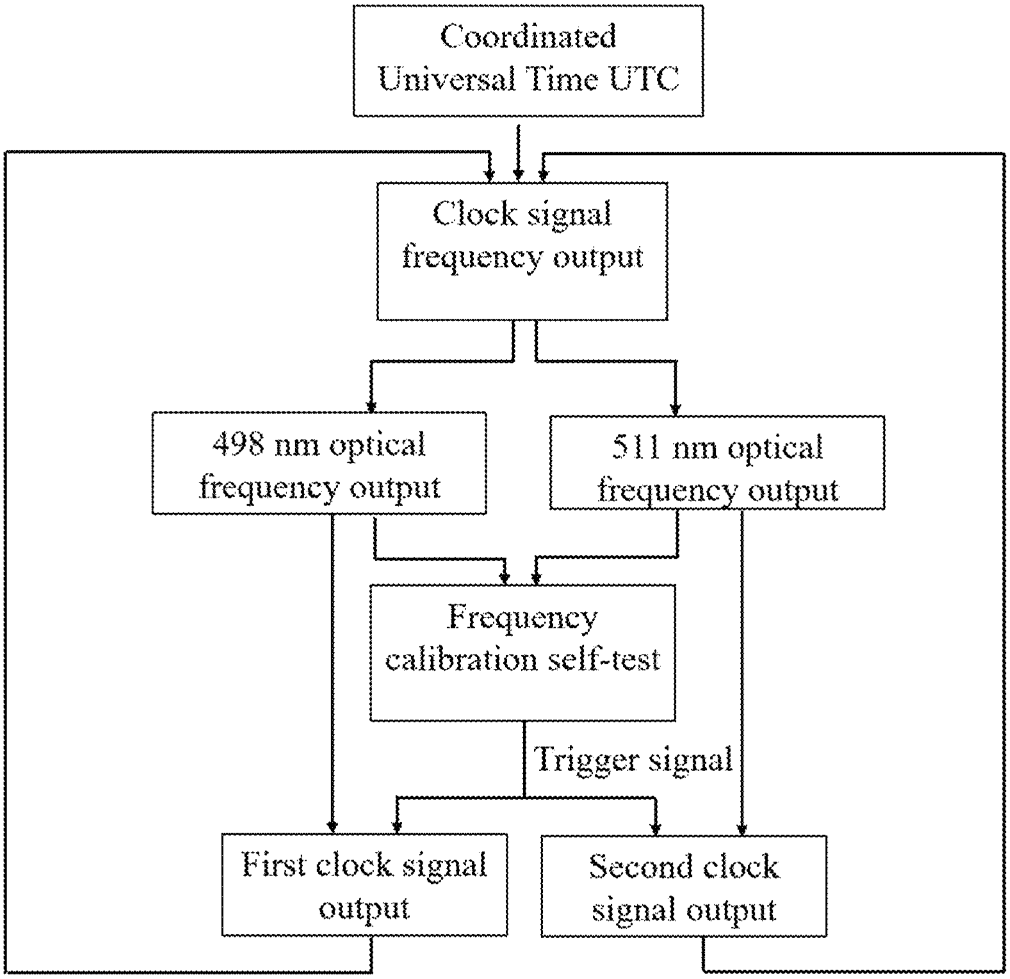
FIG. 2: A schematic diagram of the alternating output and mutual verification of the first and second clock signals in Example 2 of the present invention.

The attached drawing includes markings and their corresponding component names as follows:

1—Cryogenic ion trap system, 2—Highly charged ions source, 3—Ion beamline system, 4—Ultraviolet fluorescence collection system, 5—Servo feedback circuit, 6—First acousto-optic modulator, 7—498 nm narrow linewidth laser, 8—Second acousto-optic modulator, 9—511 nm narrow linewidth laser, 10—Optical frequency comb, 11—Clock signal output system, 12—FPGA control system, 13—313 nm Doppler cooling laser system, 14—313 nm repumping laser system, 15—313 nm Raman sideband cooling laser system, 16—First clock signal, 17—Second clock signal.

DETAILED DESCRIPTION OF THE EMBODIMENT

In order to facilitate the understanding and implementation of the present invention by those skilled in the art, the following detailed description of the present invention is provided in conjunction with specific embodiments. These embodiments are presented for illustrative purposes only, to further elucidate the principles of the invention, and should not be construed as limiting the scope of the invention in any way.

Example 1

A highly charged Nickel ion optical clock, comprising an optical clock system and an FPGA control system 12. The optical clock system includes a cryogenic ion trap system 1, a highly charged ions source 2, and an ion beamline system 3. The highly charged ions source 2 generates highly charged Nickel ions. A pulse beam of highly charged Nickel ions is formed from the highly charged ions source 2 and output to the ion beamline system 3. The ion beamline system 3 selects and collimates the pulse beam of $Ni^{12+}$ ions, decelerates it, and then directs it to the cryogenic ion trap system 1, where the $Ni^{12+}$ ions are trapped. The cryogenic ion trap system 1 also prepares and traps $Be^+$ ions, which are used to perform sympathetic cooling of the $Ni^{12+}$ ions.

The optical clock system also includes an ultraviolet fluorescence collection system 4, a laser modulation system, and a servo feedback circuit 5. The laser modulation system outputs a frequency-swept laser to the cryogenic ion trap system 1, exciting the $Ni^{12+}$ ions to an excited state. The $Ni^{12+}$ ions then transfer external state information to the $Be^+$ ions, which emit a 313 nm fluorescence signal. The ultraviolet fluorescence collection system 4 collects the 313 nm fluorescence signal emitted by the $Be^+$ ions. Based on the intensity of the 313 nm fluorescence, it can be determined whether the $Ni^{12+}$ ions have been successfully excited. The system then acquires the spectral line shape of the $Ni^{12+}$ ion transition and outputs this data to the servo feedback circuit 5. The servo feedback circuit 5 calculates the center value of the spectral line shape of the $Ni^{12+}$ ion transition. Based on this center value, the servo feedback circuit outputs an error signal to the laser modulation system. The laser modulation system, in turn, adjusts the frequency of the output laser according to the error signal, locking the frequency of the laser to the center value of the $Ni^{12+}$ ion transition spectral line. Since the center value of the $Ni^{12+}$ ion transition spectral line is inherent and unchanging, when the ultraviolet fluorescence collection system continuously detects 313 nm fluorescence signals that correspond to the center value of the $Ni^{12+}$ ion transition spectral line, it indicates that the laser frequency output by the laser modulation system is fully locked to the center value of the $Ni^{12+}$ ion transition spectral line.

The optical clock system also includes an optical frequency comb 10 and a clock signal output system 11. The laser modulation system outputs the frequency-locked laser to the optical frequency comb 10, which measures the frequency of the locked laser. The optical frequency comb 10 then transmits the measured laser frequency to the FPGA control system 12, which outputs a clock signal to the clock signal output system 11. The clock signal output system 11 subsequently outputs the clock signal.

The optical clock system further includes a 313 nm Doppler cooling laser system 13, a 313 nm repumping laser system 14, and a 313 nm Raman sideband cooling laser system 15. The 313 nm Doppler cooling laser system 13 and the 313 nm repumping laser system 14 each output 313 nm Doppler cooling and repumping lasers to the cryogenic ion trap system 1 to perform Doppler cooling on the $Be^+$ ions, while the $Ni^{12+}$ ions are sympathetically cooled. The 313 nm Raman sideband cooling laser system 15 outputs a 313 nm Raman sideband cooling laser to the cryogenic ion trap system 1 to perform Raman sideband cooling on the Doppler-cooled $Be^+$ ions, with the $Ni^{12+}$ ions being sympathetically cooled to the vibrational ground state. The FPGA control system 12 is also connected to the 313 nm Doppler cooling laser system 13, the 313 nm repumping laser system 14, and the 313 nm Raman sideband cooling laser system 15 via sequence control signal lines.

Additionally, the FPGA control system 12 is responsible for controlling the switch timing of each module in the optical clock system. The FPGA control system 12 is also connected to the cryogenic ion trap system 1, the ion beamline system 3, the ultraviolet fluorescence collection system 4, the laser modulation system, the optical frequency comb 10, and the clock signal output system 11 via sequence control signal lines.

The laser modulation system comprises two laser modulation modules, namely the first laser modulation module and the second laser modulation module. The first laser modulation module includes a first acousto-optic modulator 6 and a 498 nm narrow linewidth laser 7. The 498 nm narrow linewidth laser 7 outputs the 498 nm narrow linewidth laser to the laser input port of the first acousto-optic modulator 6. The servo feedback circuit 5 outputs an error signal to the modulation input port of the first acousto-optic modulator 6. The laser output port of the first acousto-optic modulator 6 outputs a 498 nm narrow linewidth frequency-swept laser or a 498 nm narrow linewidth frequency-shifted laser. The FPGA control system 12 is also connected to the first acousto-optic modulator 6 and the 498 nm narrow linewidth laser 7 via sequence control signal lines.

The second laser modulation module includes a second acousto-optic modulator 8 and a 511 nm narrow linewidth laser 9. The 511 nm narrow linewidth laser 9 outputs the 511 nm narrow linewidth laser to the laser input port of the second acousto-optic modulator 8. The servo feedback circuit 5 outputs an error signal to the modulation input port of the second acousto-optic modulator 8. The laser output port of the second acousto-optic modulator 8 outputs a 511 nm narrow linewidth frequency-swept laser or a 511 nm narrow linewidth frequency-shifted laser. The FPGA control system 12 is also connected to the second acousto-optic modulator 8 and the 511 nm narrow linewidth laser 9 via sequence control signal lines.

When the first acousto-optic modulator 6 and the 498 nm narrow linewidth laser 7 are used, the FPGA control system 12 outputs the first clock signal 16 to the clock signal output system 11, which then outputs the first clock signal 16. When the second acousto-optic modulator 8 and the 511 nm narrow linewidth laser 9 are used, the FPGA control system 12 outputs the second clock signal 17 to the clock signal output system 11, which then outputs the second clock signal 17.

In the present invention, the ions generated by the highly charged ions source 2 depend on the target material placed and the parameters of the ion source, and different charge states of various types of highly charged ions can be generated simultaneously.

In the present invention, the selection, collimation, and deceleration of the $Ni^{12+}$ ions in the highly charged ion beamline system 3 are achieved by real-time control of the voltage values of the electrodes involved and the switching timing of these voltage values by the FPGA. The purity of the selected $Ni^{12+}$ ions can reach over 90%.

In the present invention, the 313 nm Doppler cooling laser system 13, the 313 nm repumping laser system 14, and the 313 nm Raman sideband cooling laser system 15 all include components for polarizing the output laser, adjusting the laser frequency, and locking the laser, such as acousto-optic modulators, polarizers, waveplates, and laser output switches. All of these systems are controlled in real time by the FPGA control system 12.

Example 2

A method for realizing a highly charged Nickel ion optical clock, utilizing the highly charged Nickel ion optical clock described in Example 1, comprising the following steps:

Step 1: The FPGA control system 12 activates the cryogenic ion trap system 1 to prepare and trap $Be^+$ ions, which will be used for sympathetic cooling of $Ni^{12+}$ ions.

Step 2: The FPGA control system 12 activates the 313 nm Doppler cooling laser system 13 and the 313 nm repumping laser system 14. The 313 nm Doppler cooling laser system 13 and the 313 nm repumping laser system 14 respectively generate 313 nm Doppler cooling laser and 313 nm repumping laser. Both lasers are simultaneously applied to the $Be^+$ ions, achieving Doppler cooling of the $Be^+$ ions.

Step 3: The highly charged ions source 2 generates a pulse beam of highly charged Nickel ions and outputs it to the ion beamline system 3. The FPGA control system 12 activates the ion beamline system 3, which selects and collimates the pulse beam of $Ni^{12+}$ ions, decelerates it, and outputs it to the cryogenic ion trap system 1. The cryogenic ion trap system 1 traps the $Ni^{12+}$ ions in the pulse beam. The $Ni^{12+}$ ions trapped in the cryogenic ion trap system 1 are sympathetically cooled by the Doppler-cooled $Be^+$ ions through Coulomb interactions between the ions.

Step 4: The FPGA control system 12 activates the 313 nm Raman sideband cooling laser system 15. The 313 nm Raman sideband cooling laser system 15 generates 313 nm Raman sideband cooling laser, which is applied to the $Be^+$ ions to achieve Raman sideband cooling. Simultaneously, the $Ni^{12+}$ ions are sympathetically cooled to the vibrational ground state by the $Be^+$ ions.

Step 5: The FPGA control system 12 activates the 498 nm narrow linewidth laser system 7 to generate 498 nm narrow linewidth laser. The 498 nm narrow linewidth laser is directed to the first acousto-optic modulator 6, which applies the 498 nm narrow linewidth laser to the $Ni^{12+}$ ions in the vibrational ground state, exciting the $Ni^{12+}$ ions to the first excited state (specifically, the excited state $3s^23p^4\ ^3P_0$). The $Ni^{12+}$ ions transfer external state information to the $Be^+$ ions, which emit a 313 nm fluorescence signal.

Step 6: The FPGA control system 12 activates the ultraviolet fluorescence collection system 4 to detect and collect the 313 nm fluorescence signal emitted by the $Be^+$ ions and transmits the 313 nm fluorescence signal to the servo feedback circuit 5.

Step 7: The FPGA control system 12 controls the first acousto-optic modulator 6 to frequency sweep the 498 nm narrow linewidth laser. The first acousto-optic modulator 6 outputs the frequency-swept laser to the cryogenic ion trap system 1. The ultraviolet fluorescence collection system 4 simultaneously detects and collects the 313 nm fluorescence signal emitted by the $Be^+$ ions, obtaining the spectral line shape of the 498 nm transition of the $Ni^{12+}$ ions.

Step 8: The ultraviolet fluorescence collection system 4 transmits the spectral line shape of the 498 nm transition of the $Ni^{12+}$ ions to the servo feedback circuit 5. The servo feedback circuit 5 calculates the center value of the 498 nm transition spectral line of the $Ni^{12+}$ ions. Based on the 313 nm fluorescence signal obtained in Step 5, the servo feedback circuit 5 calculates the deviation of the 313 nm fluorescence signal from the center value of the 498 nm transition spectral line of the $Ni^{12+}$ ions and outputs an error signal to the first acousto-optic modulator 6. The acousto-optic modulator then shifts the frequency of the 498 nm narrow linewidth laser, locking the laser frequency to the spectral line center value of the 498 nm transition of $Ni^{12+}$ ions, at which point the $Be^+$ ions emit the maximum fluorescence signal.

Step 9: The first acousto-optic modulator 6 outputs the frequency-locked 498 nm narrow linewidth laser to the optical frequency comb 10 for heterodyne detection. The optical frequency comb measures the laser frequency of the frequency-locked 498 nm narrow linewidth laser and outputs the measured frequency to the FPGA control system 12, which then outputs the first clock signal 16 to the clock signal output system 11, which subsequently outputs the first clock signal 16.

Step 10: An initial clock reference (such as Coordinated Universal Time (UTC) or the national atomic time standard (UTC(NIM))) is set. The FPGA control system 12 is configured to control the optical clock system to cyclically execute Step 2 through 9 for ten cycles, with a period of 100 ms per cycle, based on an initial clock reference.

Step 11: The FPGA control system 12 switches the 498 nm narrow linewidth laser system 7 to the 511 nm narrow linewidth laser system 9 and switches the first acousto-optic modulator 6 to the second acousto-optic modulator 8. The 511 nm narrow linewidth laser system 9 generates 511 nm narrow linewidth laser, and the second acousto-optic modulator 8 performs frequency shifting and frequency sweeping on the 511 nm narrow linewidth laser. Step 1 through 5 are then repeated, exciting the $Ni^{12+}$ ions to the second excited state (specifically, the excited state $3s^23p^4\ ^3P_1$). Step 6 and 7 are repeated, with the ultraviolet fluorescence collection system 4 obtaining the spectral line shape of the 511 nm transition of the $Ni^{12+}$ ions. Step 7 is repeated, with the servo feedback circuit 5 calculating the center value of the 511 nm transition spectral line of the $Ni^{12+}$ ions. The acousto-optic modulator locks the frequency of the 511 nm narrow linewidth laser to the spectral line center value of the 511 nm transition of $Ni^{12+}$ ions. Step 8 and 9 are repeated, with the FPGA control system 12 outputting the second clock signal 17 to the clock signal output system 11, which then outputs the second clock signal 17. Step 10 is repeated, FPGA control system 12 controls the optical clock system with the first clock signal 16 as the clock reference, cycling ten times with a cycle of 100 ms.

Step 12: Step 1 through 11 are repeated, with the clock signal output system 11 alternately outputting the first clock signal 16 and the second clock signal 17. During the repetition of Step 10, the first time the FPGA control system 12 executes Step 10, it outputs the first clock signal 16 using the initial clock reference as the clock reference. For subsequent clock signal outputs, the clock reference is based on the clock signal output from the previous cycle.

The FPGA control system 12 also records the frequency values of the frequency-locked 498 nm narrow linewidth laser $f_1$ and the frequency-locked 511 nm narrow linewidth laser $f_2$, and calculates the initial ratio $R_0$ of $f_1$ and $f_2$ based on the first recorded frequency values. After each new $f_2$ is recorded, the ratio R of the new $f_1$ and new $f_2$ is calculated, and it is checked whether R equals $R_0$. If R equals $R_0$, the verification is considered normal. If R does not equal $R_0$, the verification is considered a fault condition, thereby enabling mutual verification between the first clock signal 16 and the second clock signal 17.

In this embodiment, the FPGA control system 12 switches between the first laser modulation module and the second laser modulation module with a frequency of 1 Hz, ensuring that the clock signal output system 11 continuously switches between outputting the first clock signal 16 and the second clock signal 17. The first clock signal 16 and second clock signal 17 alternate with a 2 s period and are mutually verified.

The present invention ensures that one clock signal is output in real time, and frequency calibration using the two laser frequency values (laser frequency value $f_1$ and laser frequency value $f_2$) allows for the timely detection of operational issues. This avoids the problem of a single optical frequency clock drifting out of synchronization with the time reference, which could result in erroneous clock signal outputs that are not immediately detectable.

The invention employs highly charged $Ni^{12+}$ ions as the reference system for the optical clock, offering superior anti-interference capabilities and measurement precision compared to current traditional low-charge state ion optical clocks. Furthermore, the highly charged $Ni^{12+}$ ions possess two transition spectral lines at 498 nm and 511 nm, which can be used as clock transitions. The use of both 498 nm and 511 nm lasers allows for the output of two clock signals from a single ion reference system, enabling mutual verification between the two signals.

It is worth noting that the embodiments described in this invention are merely illustrative examples reflecting the essence of the present invention. A person skilled in the relevant technical field may make various modifications, supplements, or adopt similar alternatives to the described embodiments, without deviating from the spirit of the present invention or exceeding the scope as defined in the appended claims.

What is claimed is:

1. A highly charged Nickel ion optical clock including an optical clock system and an FPGA control system, characterized in that the optical clock system includes a cryogenic ion trap system, a highly charged ions source, an ion beamline system, a ultraviolet fluorescence collection system, a laser modulation system, a servo feedback circuit, an optical frequency comb, and clock signal output system, the highly charged ions source outputs a pulsed beam of highly charged Nickel ions to the ion beamline system, the ion beamline system filters out the pulse beam of $Ni^{12+}$ ions, collimates and decelerates it, and outputs it to the cryogenic ion trap system, the cryogenic ion system prepares and traps $Be^{+}$ ions, and also traps $Ni^{12+}$ ions, the laser modulation system outputs a swept laser to the cryogenic ion trap system to excite $Ni^{12+}$ ions to an excited state, $Ni^{12+}$ ions transmit external state information to $Be^{+}$ ions, $Be^{+}$ ions emit a 313 nm fluorescence signal, and the ultraviolet fluorescence collection system collects the 313 nm fluorescence signal emitted by $Be^{+}$ ions to obtain the spectral line shape of $Ni^{12+}$ ion transition and outputs it to the servo feedback circuit, the servo feedback circuit calculates the spectral line center value of $Ni^{12+}$ ion transition, and the servo feedback circuit outputs an error signal to the laser modulation system based on the spectral line center value, the laser modulation system shifts the output laser frequency according to the error signal, so that the shifted laser frequency locks to the spectral line center value of $Ni^{12+}$ ion transition, the laser modulation system outputs the locked laser to the optical frequency comb, which in turn generates an optical frequency comb, measure the laser frequency of the locked laser, and the optical frequency comb outputs the measured laser frequency to the FPGA Control system, FPGA control system outputs clock signals to clock signal output system, clock signal output system outputs clock signals, FPGA control system is also connected to the cryogenic ion trap system, ion beamline system, ultraviolet fluorescence collection system, laser modulation system, optical frequency comb, and clock signal output system through timing control signal lines.

2. A highly charged Nickel ion clock according to claim 1, characterized in that the clock system further includes a 313 nm Doppler cooling laser system, a 313 nm repumping laser system, and a 313 nm Raman sideband cooling laser system, the 313 nm Doppler cooling laser system and the 313 nm repumping laser system respectively output 313 nm Doppler cooling laser and 313 nm repumping laser to the cryogenic ion trap system for Doppler cooling of $Be^{+}$ ions, and $Ni^{12+}$ ions are sympathetically cooled; The 313 nm Raman sideband cooling laser system outputs the 313 nm Raman sideband cooling laser to the cryogenic ion trap system for Raman sideband cooling of $Be^{+}$ ions after Doppler cooling, and $Ni^{12+}$ ions are sympathetically cooled to the vibrational quantum ground state; The FPGA control system is also connected to the 313 nm Doppler cooling laser system, 313 nm repumping laser system, and 313 nm Raman sideband cooling laser system respectively through timing control signal lines.

3. A highly charged Nickel ion clock according to claim 2, characterized in that the laser modulation system includes a first laser modulation module, which includes a first acousto-optic modulator and a 498 nm narrow linewidth laser, the 498 nm narrow linewidth laser outputs 498 nm narrow linewidth laser to the laser input terminal of the first acousto-optic modulator, a servo feedback circuit outputs an error signal to the modulation input terminal of the first acousto-optic modulator, and the laser output terminal of the first acousto-optic modulator outputs 498 nm narrow linewidth swept-frequency laser or 498 nm narrow linewidth frequency-shifted laser, the FPGA control system is also connected to the first acousto-optic modulator and the 498 nm narrow linewidth laser through timing control signal lines; When using the first acousto-optic modulator and 498 nm narrow linewidth laser, the FPGA control system outputs the first clock signal to the clock signal output system, which outputs the first clock signal.

4. A highly charged Nickel ion clock according to claim 3, characterized in that the laser modulation system further includes a second laser modulation module, the second laser modulation module includes a second acousto-optic modulator and a 511 nm narrow linewidth laser, the 511 nm narrow linewidth laser outputs a 511 nm narrow linewidth laser to the laser input terminal of the second acousto-optic modulator, the servo feedback circuit outputs an error signal to the modulation input terminal of the second acousto-optic modulator, and the laser output terminal of the second acousto-optic modulator outputs a 511 nm narrow linewidth swept-frequency laser or a 511 nm narrow linewidth frequency-shifted laser, the FPGA control system is also connected to the second acousto-optic modulator and the 511 nm narrow-linewidth laser via a timing control signal line, when the second acousto-optic modulator and the 511 nm narrow linewidth laser are adopted, the FPGA control system outputs a second clock signal to the clock signal output system, and the clock signal output system outputs the second clock signal.

5. A method for implementing a highly charged Nickel ion clock, utilizing the highly charged Nickel ion clock as claimed in claim 4, characterized in that it includes the following steps:

Step 1: The FPGA control system activates the cryogenic ion trap system to prepare and trap $Be^{+}$ ions, Step 2: The FPGA control system activates the 313 nm Doppler cooling laser system and the 313 nm repumping laser system to perform Doppler cooling on $Be^{+}$ ions, Step 3: The highly charged ions source generates a pulsed beam of highly charged Nickel ions, the FPGA control system activates the ion beamline system to filter out the pulsed beam of $Ni^{12+}$ ions, which is then collimated, decelerated, and output to the cryogenic ion trap system, the cryogenic ion trap system traps the $Ni^{12+}$ ions, and the $Ni^{12+}$ ions are sympathetically cooled by $Be^{+}$ ions, Step 4: The FPGA control system activates the 313 nm Raman sideband cooling laser system to perform Raman sideband cooling on the $Be^{+}$ ions that have undergone Doppler cooling, the $Ni^{12+}$ ions are sympathetically cooled to the vibrational quantum ground state by the $Be^{+}$ ions, Step 5: The FPGA control system activates the 498 nm narrow linewidth laser generated by the 498 nm narrow linewidth laser system, and performs frequency shifting on the laser via the first acousto-optic modulator, the frequency-shifted 498 nm narrow linewidth laser acts on the $Ni^{12+}$ ions in the vibrational quantum ground state, exciting the $Ni^{12+}$ ions to the first excited state, the $Ni^{12+}$ ions transfer external state information to the $Be^{+}$ ions, and the $Be^{+}$ ions emit a 313 nm fluorescence signal, Step 6: The FPGA control system activates the ultraviolet fluorescence collection system to detect and collect the 313 nm fluorescence signal emitted by $Be^{+}$ ions, and outputs the 313 nm fluorescence signal to the servo feedback circuit, Step 7: The FPGA control system controls the first acousto-optic modulator to perform frequency sweeping on the 498 nm narrow linewidth laser, the first acousto-optic modulator outputs the swept-frequency laser to the cryogenic ion trap system, the ultraviolet fluorescence collection system synchronously detects and collects the 313 nm fluorescence signal emitted by $Be^{+}$ ions, obtaining the spectral line shape of the 498 nm transition of $Ni^{12+}$ ions, Step 8: The ultraviolet fluorescence collection system transmits the spectral line shape of the 498 nm transition of $Ni^{12+}$ ions to the servo feedback circuit, the servo feedback circuit calculates the spectral line center value of the 498 nm transition of $Ni^{12+}$ ions, and then calculates the deviation of the 313 nm fluorescence signal from this spectral line center value, it then feeds back an error signal to the first acousto-optic modulator, based on the error signal, the acousto-optic modulator performs frequency shifting on the 498 nm narrow linewidth laser, locking the laser frequency of the 498 nm narrow linewidth laser to the spectral line center value of the 498 nm transition of $Ni^{12+}$ ions, Step 9: The first acousto-optic modulator outputs the 498 nm narrow linewidth laser with a locked laser frequency to the optical frequency comb for beat frequency generation, the laser frequency value of the 498 nm narrow linewidth laser (after laser frequency locking) is measured and output to the FPGA control system, the FPGA control system outputs the first clock signal to the clock signal output system, and the clock signal output system outputs the first clock signal, Step 10: Set an initial clock reference, the FPGA control system controls the optical clock system to cycle through Step 2 through 9 ten times at a set period based on the initial clock reference, Step 11: The FPGA control system switches the 498 nm narrow linewidth laser system to the 511 nm narrow linewidth laser system, and switches the first acousto-optic modulator to the second acousto-optic modulator, the 511 nm narrow linewidth laser system generates 511 nm narrow linewidth laser, and the second acousto-optic modulator performs frequency shifting and frequency sweeping on the 511 nm narrow linewidth laser, then repeats Step 1 through 10, Step 12: Repeat Step 1 through 11, the clock signal output system alternately outputs the first clock signal and the second clock signal, and the first clock signal and the second clock signal verify each other.

6. The method of implementing a highly charged Nickel ion optical clock according to claim 5, characterized in that Step 11 specifically includes the following process: the FPGA control system switches the 498 nm narrow linewidth laser system to the 511 nm narrow linewidth laser system, switches the first acousto-optic modulator to the second acousto-optic modulator, and the 511 nm narrow linewidth laser system generates 511 nm narrow linewidth laser and the second acousto-optic modulator to shift and sweep the 511 nm narrow linewidth laser, repeats Step 1 through 5, and excites the $Ni^{12+}$ ions to the second excited state; repeats Step 6 and 7, and the ultraviolet fluorescence collection system obtains the spectral line shape of 511 nm transition of $Ni^{12+}$ ions; Repeat Step 7, the servo feedback circuit calculates the spectral line center value of the 511 nm transition of $Ni^{12+}$ ions, and the acousto-optic modulator locks the laser frequency of the 511 nm narrow line width laser to the spectral line center value of the 511 nm transition of $Ni^{12+}$ ions; repeats Step 8 and 9, the FPGA control system outputs the second clock signal to the clock signal output system, and the clock signal output system outputs the second clock signal; repeats Step 10, the FPGA control system controls the optical clock system with the first clock signal as the clock reference to set the cycle ten times.

7. The method of implementing a highly charged Nickel ion optical clock according to claim 6, characterized in that when Step 10 is executed for the first time, the FPGA control system outputs the first clock signal with the initial clock reference as the clock reference, and then the clock signal outputted by the previous clock signal is used as the clock reference for each output clock signal.

8. The method of implementing a highly charged Nickel ion optical clock according to claim 7, characterized in that in Step 11, the first clock signal and the second clock signal are verified to each other by the following method:

The FPGA control system records the laser frequency value $f_1$ of the locked 498 nm narrow linewidth laser and the laser frequency value $f_2$ of the locked 511 nm narrow linewidth laser respectively, and obtains the initial ratio $R_0$ of $f_1$ and $f_2$ based on the first recorded laser frequency value $f_1$ and laser frequency value $f_2$, after that, after recording the new $f_2$ each time, R is calculated and the ratio R of the new $f_1$ and the new $f_2$ is checked, and checks whether R is equal to $R_0$, if R is equal to $R_0$, then it is checked as a normal state; if R is not equal to $R_0$, then it is checked as a fault state.

* * * * *